UNITED STATES PATENT OFFICE 2,463,779

N-ACYLATED DERIVATIVES OF GLUTAMIC ACID AND PROCESS FOR PREPARING THEM

Ernest B. Kester, Berkeley, Calif., assignor to the United States of America as represented by the Secretary of Agriculture No Drawing. Application August 26, 1947, Serial No. 770,773

9 Claims. (Cl. 260—404)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to N-acyl derivatives of glutamic acid, particularly N-acyl glutamic acids and their salts wherein the acyl groups are aliphatic and contain from 8 to 20 carbon atoms, and has among its objects the provision of such new compounds and processes for preparing them. Other objects will be apparent from the description of the invention.

I have found that N-acyl derivatives of glutamic acid which may be represented by the general formula

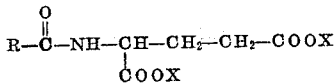

wherein

is an aliphatic acyl radical containing from 8 to 20 carbon atoms and X is a cation, can be prepared by reacting an aliphatic acyl halide containing from 8 to 20 carbon atoms with glutamic acid in the presence of a base selected from the group consisting of potassium hydroxide, magnesium oxide, magnesium hydroxide or mixtures thereof. These bases are specific and the N-acyl glutamic acid derivatives cannot be prepared by the analogous reaction in the presence of sodium hydroxide. The products, N-acyl glutamic acids and their salts wherein the acyl group is aliphatic and contains 8 to 20 carbon atoms, are new compounds and are useful as wetting agents, foaming agents, detergents, and so forth.

In the reaction, it is necessary to use cooling means to control the temperature of the reaction, since if the temperature rises, the acyl halide will be saponified and thus will not be available for the desired reaction. Generally, temperatures about from −5° C. to about +5° C. are suitable. The preferred temperature is about 0° C. which is easy to maintain with an ice-salt bath and which is conducive to good yields of acylated compounds. Lower temperatures than about −5° C. are not particularly suitable because the reaction mixture may become too viscous for proper agitation or may even partially freeze. Agitation is, of course, required to promote contact between the reactants.

The acyl halide is employed in the ratio of about from 1 to 1.5 mols per mol of glutamic acid. It is preferred to employ about 1.25 mols of acyl halide per mol of glutamic acid so that there will be sufficient acyl halide available for the desired reaction even after the inevitable loss thereof due to saponification occurs.

The potassium hydroxide, magnesium oxide, or magnesium hydroxide should be present in the ratio of 3 to 4 equivalents per mol of glutamic acid when all the reactants have been added. In the reaction, three equivalents of the base are essential to neutralize the 2 carboxyl groups on the glutamic acid and the one mol of HCl produced in the reaction. An excess of base is preferable to maintain the pH of the reaction mixture at 7 or above in order to suppress coupling of the glutamic acid molecules and formation of peptide-like compounds. Mixtures of the basic compounds can be used, as for example, a mixture of potassium hydroxide and magnesium hydroxide.

The reaction is preferably conducted in the presence of water, and while the amount of water is not critical, generally enough water should be used to maintain the reaction mixture in a fluid condition so that it can be properly agitated to obtain good contact between the reactants.

It is preferred to add the acyl halide gradually, as by dropping, to the glutamic acid and base to prevent sudden rise in temperatures and to limit the amount of acyl halide present at any given instant, thus diminishing opportunity for saponification thereof.

When the reaction is complete, there is present in the mixture the N-acyl glutamic acid in the form of its potassium (or magnesium) salt together with by-product inorganic and small amounts of soaps of fatty acid salts. This mixture is useful directly for many purposes. However, if it is desired to purify the material, an acid is added (such as hydrochloric, sulphuric, or other mineral acid), whereby the acyl glutamic acid will precipitate and can be removed by filtration or decanting.

The N-acyl glutamic acid can be easily converted into any desired salt by reaction with the proper base and evaporation of water produced. Thus, any number of different salts may be produced by neutralizing the acyl glutamic acid with a basic material, such as sodium hydroxide, sodium carbonate, potassium hydroxide, potassium carbonate, calcium oxide, calcium hydroxide, magnesium oxide, magnesium hydroxide, barium hydroxide, ferric hydroxide, ammonia, ammonium hydroxide, and so forth. Salts of organic bases can be prepared in the same manner by neutralization with amines or substituted ammonium hydroxide, such as methyl amine, ethyl amine, ethanol amine, triethanol amine, pyridine, piperidine, morpholine, quinoline, brucine, strychnine, ephedrine, and so forth.

The following examples disclose particular steps, conditions and compounds within the scope of this invention, but it is to be understood that these examples are given only by way of illustration and not limitation.

Example I

Preparation of N-lauroyl gultamic acid

A sample of glutamic acid weighing 58.8 grams was dissolved in 429.5 ml. of 1.86 N aqueous potassium hydroxide and cooled to 0° C. To this clear solution, 87.6 grams of lauroyl chloride and 214.75 ml. of 1.86 N aqueous potassium hydroxide were added dropwise with vigorous stirring, simultaneously, over a period of 30 minutes. Stirring was continued for 1.5 hours after both reagents had been added, after which the reaction mixture, containing dipotassium N-lauroyl glutamate and potassium chloride, was allowed to come slowly to room temperature. After standing overnight 2 N hydrochloric acid was added until precipitation was complete. The mixture was then placed on the steam bath for an hour, during which time the precipitate melted completely and rose to the surface as an oily layer. This upper layer was decanted and crystallized from hexane and then from toluene. The product, N-lauroyl glutamic acid, weighed 40.2 grams representing a yield of 30.6% of theoretical. When recrystallized from carbon tetrachloride, it had a neutralization equivalent of 166.5 (calculated 164.72), a melting point of 95°–96° C., and a nitrogen content of 4.3%. The percent nitrogen calculated for this compound from the structural formula is 4.26%.

Example II

Preparation of disodium N-lauroyl glutamate

N-lauroyl glutamic acid, prepared as described in Example I, was dissolved in alcohol and neutralized with an aqueous solution of sodium hydroxide. The liquid was then evaporated to obtain disodium N-lauroyl glutamate in dry form. The salt so obtained was in a sticky condition and was improved by dissolving it in water and adding an excess of acetone. The disodium N-lauroyl glutamate precipitated out of solution in crystalline, non-hygroscopic form. The salt was found to be insoluble in the common organic solvents, such as toluene, ether, hexane, chloroform, alcohol, acetone, and so forth, but freely soluble in water to form a solution having a powerful detergent action.

Example III

Preparation of N-oleyl glutamic acid 14.7 grams of glutamic acid was suspended in 150 ml. of water and 12.1 grams of magnesium oxide was added. Both glutamic acid and magnesium oxide are only slightly soluble in water below 15° C. However, when the two compounds are mixed, magnesium glutamate is formed which is freely soluble in water. The suspension of magnesium oxide in magnesium glutamate solution was cooled to 0° C. in a freezing bath and then 50 ml. of ether was added. While stirring rapidly, 45.24 grams of oleyl chloride was added dropwise. The stirring was continued for one hour after addition of the oleyl chloride and then 60 ml. of concentrated hydrochloric acid diluted with 90 ml. of water was added. One hundred ml. of ether was added to dissolve the product and the aqueous phase withdrawn. The ether phase was evaporated and the solid material recrystallized from a petroleum fraction consisting chiefly of pentane and hexane and having a boiling range of 25° to 50° C., and finally from toluene with the addition of the aforesaid petroleum fraction to induce separation of the compound. The product, N-oleyl glutamic acid, had an equivalent weight of 205, by titration. The calculated equivalent weight for a pure specimen of this compound is 204.77.

Example IV

Preparation of N-stearoyl glutamic acid 29.4 grams of glutamic acid was dissolved in 211 ml. of 1.94 N aqueous potassium hydroxide solution. After cooling to 0° C., 60.4 grams of stearoyl chloride and 105.5 ml. of 1.94 N aqueous potassium hydroxide solution were added simultaneously and dropwise. After all the reactants had been added, the stirring was continued for an additional 1.5 hours and the mixture then allowed to reach room temperature gradually. At this point, 53.4 ml. of concentrated hydrochloric acid, diluted to 2 N strength, was added to precipitate the crude product. The reaction mixture was heated on a steam bath for an hour, after which time the product was extracted with 300 ml. of toluene. On cooling, a precipitate developed which was recrystallized twice from an n-heptane fraction. The product, N-stearoyl glutamic acid, had a neutral equivalent of 207, a melting point of 113°–113.5° C., and a nitrogen content of 3.49%. The neutral equivalent and nitrogen content of stearoyl glutamic acid, calculated from the structural formula, are 206.79 and 3.38%, respectively.

Example V

Preparation of N-palmitoyl glutamic acid 14.7 grams of glumatic acid was suspended in 150 ml. of water together with 12.1 grams of magnesium oxide. To the solution of magnesium glutamate admixed with excess magnesium oxide, 50 ml. of ether was added. The mixture was cooled to 0° C., and while stirring vigorously, 41.2 grams of palmitoyl chloride was added dropwise over a period of a half hour. The mixture was stirred an additional hour, after which it was allowed to gradually reach room temperature. The crude product was liberated from its magnesium salt by the addition of 60 ml. of concentrated hydrochloric acid diluted to 150 ml. with water. After warming, the mixture was extracted with 200 ml. of toluene. On cooling the toluene solution, a gelatinous mass of material weighing 28.75 grams was obtained. This material was recrystallized from a mixture of 175 ml. hexane and 25 ml. toluene, and then from hexane alone. The final product, N-palmitoyl glutamic acid, weighed 16 grams (yield 41.5%) and had a neutral equivalent of 196. The neutral equivalent for this compound calculated from the structural formula is 192.76.

Example VI

Preparation of myristoyl glutamic acid 14.7 grams of glutamic acid was suspended in 150 ml. of water and 12.1 grams of magnesium oxide and 50 ml. of ether were added. The solution of magnesium glutamate in which the excess magnesium oxide was suspended was cooled to 0° C. While stirring vigorously, 37 grams of myristoyl chloride was added dropwise. After this addition was complete, stirring was continued for an hour and the reaction mixture was then allowed to gradually reach room temperature, The product was sprung from its magnesium salt by the addition of 60 ml. of concentrated hydrochloric acid diluted with 150 ml. of water. The crude product precipitated and was removed from the mixture. After washing with petroleum solvent to remove any myristic acid that might be present, the precipitate was crystallized from toluene. The product, N-myristoyl glutamic acid, weighed 18.5 grams, representing a yield of 52% and had a neutralization equivalent of 179. The neutral equivalent calculated from the structural formula is 178.74.

The process of this invention is of wide versatility and can be used to prepare many N-acyl glutamic acids and/or their salts. Thus, the halide of any aliphatic acid having from 8 to 20 carbon atoms may be employed. For example, the acyl halide reactant may be any one of the following: octanoyl chloride, nonanoyl chloride, decanoyl chloride, undecanoyl chloride, lauroyl chloride, tridecanoyl chloride, myristoyl chloride, pentadecanoyl chloride, palmitoyl chloride, stearoyl chloride, margaroyl chloride, nondecanoyl chloride, arachidoyl chloride, oleyl chloride, undecylenyl chloride, elaidyl chloride, ricinoleyl chloride, palmitoleyl chloride, erucyl chloride, brassidyl chloride, linoleyl chloride, and so forth. Although it is preferred to use the acyl chlorides, the corresponding bromides or iodides may also be employed. Thus, one may use any of the aforementioned acyl chlorides in the form of their corresponding bromide or iodide, as, for example, lauroyl bromide, myristoyl bromide, palmitoyl bromide, and so forth. Further, if it is not desired to produce an individual compound but mixtures of N-acyl glutamic compounds, mixtures of different acyl halides may be employed, i. e., a mixture of lauroyl chloride and myristoyl chloride, a mixture of palmitoyl chloride and oleyl chloride, and so forth.

In the preparation of N-acyl glutamic acid compounds suitable as wetting agents and detergents, it is not essential to employ pure, individual acyl halides as the acylating agent. Commercially available mixtures of acyl chlorides may be used, as, for instance, a mixture of homologous acyl chlorides containing a preponderance of lauroyl chloride and smaller proportions of octanoyl chloride, decanoyl chloride, myristoyl chloride, palmitoyl chloride, and so forth. Convenient sources of acyl halides suitable for use in this process are the mixtures of fatty acids produced by the hydrolysis of fats and oils. These mixtures of fatty acids are easily converted into fatty acid chlorides by reaction with phosphorus pentachloride, phosphorus trichloride, thionyl chloride, or oxalyl chloride. The resulting mixtures of fatty acid chlorides can be used as such for the preparation of the N-acyl glutamic acid derivatives, or may be purified if individual derivatives are sought. Thus, one may employ as the acylating agent for this process the acid chlorides of almond oil fatty acids, acid chlorides of castor oil fatty acids, acid chlorides of coconut fatty acids, acid chlorides of lard fatty acids, acid chlorides of linseed fatty acids, acid chlorides of corn oil fatty acids, acid chlorides of menhaden oil fatty acids, acid chlorides of mustard oil fatty acids, acid chlorides of neat's-foot oil fatty acids, acid chlorides of olive oil fatty acids, acid chlorides of palm oil fatty acids, acid chlorides of peanut oil fatty acids, acid chlorides of poppy oil fatty acids, acid chlorides of rape oil fatty acids, acid chlorides of sperm oil fatty acids, acid chlorides of tallow fatty acids, acid chlorides of whale oil fatty acids, acid chlorides of soybean fatty acids, acid chlorides of palm kernel oil fatty acids, acid chlorides of cottonseed oil fatty acids, and so forth. Use of such mixtures of acyl chlorides will not of course produce a single chemical compound having the structure of an N-acyl glutamic acid but a mixture of different N-acyl glutamic derivatives which are admirably suited for wetting and detergent uses and which are relatively inexpensive to prepare.

Some of the novel compounds which may be prepared according to the instant process are N-octanoyl glutamic acid, N-nonanoyl glutamic acid, N-decanoyl glutamic acid, N-undecanoyl glutamic acid, N-lauroyl glutamic acid, N-tridecanoyl glutamic acid, N-myristoyl glutamic acid, N-pentadecanoyl glutamic acid, N-palmitoyl glutamic acid, N-stearoyl glutamic acid, N-margaroyl glutamic acid, N-nondecanoyl glutamic acid, N-arachidoyl glutamic acid, N-oleyl glutamic acid, N-undecylenyl glutamic acid, N-elaidyl glutamic acid, N-ricinoleyl glutamic acid, N-palmitoleyl glutamic acid, N-erucyl glutamic acid, N-brassidyl glutamic acid, N-linoleyl glutamic acid, and the disodium, dipotassium, diammonium, calcium and magnesium salts thereof. This list is not exhaustive, as many other derivatives may be prepared following the directions set forth hereinabove.

Having thus described the invention, I claim:

1. A process comprising reacting glutamic acid, an aliphatic acyl halide containing from 8 to 20 carbon atoms, and a base selected from the group consisting of potassium hydroxide, magnesium oxide, magnesium hydroxide, and mixtures thereof, in aqueous solution at a pH of at least 7.0 and at a temperature of about from −5° C. to 5° C. to produce an N-acyl glutamate, reacting the glutamate with a mineral acid to produce N-acyl glutamic acid, and neutralizing the N-acyl glutamic acid with sodium hydroxide to produce disodium N-acyl glutamate.

2. A process comprising reacting glutamic acid, an aliphatic acyl halide containing from 8 to 20 carbon atoms, and a base selected from the group consisting of potassium hydroxide, magnesium oxide, magnesium hydroxide, and mixtures thereof, in aqueous solution at a pH of at least 7.0 and at a temperature of about from −5° C. to 5° C. to produce an N-acyl glutamate, and reacting the glutamate with a mineral acid to produce N-acyl glutamic acid.

3. A process comprising reacting glutamic acid, an aliphatic acyl halide containing from 8 to 20 carbon atoms, and a base selected from the group consisting of potassium hydroxide, magnesium oxide, magnesium hydroxide, and mixtures thereof, in aqueous solution at a pH of at least 7.0 and at a temperature of about from −5° C. to 5° C. to produce an N-acyl glutamate.

4. The process of claim 3 wherein the acyl halide is lauroyl chloride.

5. The process of claim 3 wherein the acyl halide is oleyl chloride.

6. The process of claim 3 wherein the base is potassium hydroxide.

7. The process of claim 3 wherein the base is magnesium oxide.

8. The process of claim 3 wherein the base is magnesium hydroxide.

9. The process of claim 3 wherein the reaction temperature is about 0° C.

ERNEST B. KESTER.

(References on following page)

REFERENCES CITED

The following references are of record in the file of this patent:

UNITED STATES PATENTS

| Number | Name | Date |
|---|---|---|
| 1,917,252 | Harris | July 11, 1933 |
| 2,041,265 | Orthner et al. | Mar. 19, 1936 |
| 2,063,987 | Dreyfus | Dec. 15, 1936 |

OTHER REFERENCES

Jour. Biological Chemistry (1922), V. 53, pages 464, 468, 472, by Shiple et al.